(12) United States Patent
Esmaili

(10) Patent No.: US 12,710,103 B2
(45) Date of Patent: Aug. 18, 2026

(54) HOT WATER MIXING VALVE

(71) Applicant: Watts Regulator Co., North Andover, MA (US)

(72) Inventor: Mahyar Esmaili, Wilmont, NH (US)

(73) Assignee: Watts Regulator Co., North Andover, MA (US)

(*) Notice: Subject to any disclaimer, the term of this patent is extended or adjusted under 35 U.S.C. 154(b) by 143 days.

(21) Appl. No.: 18/672,236

(22) Filed: May 23, 2024

(65) Prior Publication Data

US 2025/0361941 A1 Nov. 27, 2025

(51) Int. Cl.

| | |
|---|---|
| ***F16K 11/044*** | (2006.01) |
| ***F16K 31/04*** | (2006.01) |
| ***G05D 23/13*** | (2006.01) |

(52) U.S. Cl.

CPC ............ *F16K 11/044* (2013.01); *F16K 31/04* (2013.01); *G05D 23/1306* (2013.01); *G05D 23/1353* (2013.01); *G05D 23/1373* (2013.01); *G05D 23/1386* (2013.01); *G05D 23/134* (2013.01)

(58) Field of Classification Search

CPC .............. F16K 11/044; G05D 23/1393; G05D 23/1386; G05D 23/1306; G05D 23/134; G05D 23/1353; G05D 23/137

See application file for complete search history.

(56) References Cited

U.S. PATENT DOCUMENTS

| | | | |
|---|---|---|---|
| 1,819,045 | A | 8/1931 | Snediker |
| 2,448,170 | A | 8/1948 | Brown |
| 2,499,496 | A | 3/1950 | Leslie et al. |
| 2,542,273 | A | 2/1951 | Brown |
| 3,561,481 | A | 2/1971 | Taplin |
| 3,582,229 | A | 6/1971 | Fellenberg |
| 4,039,125 | A | 8/1977 | Botnick |
| 4,867,375 | A | 9/1989 | Ueki et al. |
| 5,032,992 | A | 7/1991 | Bergmann |
| 5,033,671 | A | 7/1991 | Shiba et al. |
| 6,290,139 | B1 | 9/2001 | Kolze |

(Continued)

FOREIGN PATENT DOCUMENTS

| | | | | |
|---|---|---|---|---|
| DE | 3815499 A1 | | 12/1988 | |
| GB | 945718 A | * | 1/1964 | ........... G05D 23/134 |

(Continued)

OTHER PUBLICATIONS

DINGS Precision Motion Specialist General Catalog, Products 2024, 288 pages.

(Continued)

*Primary Examiner* — Atif H Chaudry

(74) *Attorney, Agent, or Firm* — Day Pitney LLP; George Chaclas; Anthony A. Kassas

(57) ABSTRACT

A mixing valve including a body having first and second inlets, an outlet, and a mixing chamber. A first valve seat is located between the first inlet and the mixing chamber, and a second valve seat is located between the second inlet and the mixing chamber. A shuttle is moveable in the mixing chamber between the first and second valve seats and includes a first plug facing the first valve seat and a second plug facing the second valve seat. The plugs have trim surfaces that are one of, or a combination of, a fast-opening shape, a linear shape, and an equal percentage shape.

23 Claims, 13 Drawing Sheets

(56) References Cited

U.S. PATENT DOCUMENTS

| | | | |
|---|---|---|---|
| 6,629,645 | B2 | 10/2003 | Mountford et al. |
| 8,939,173 | B2 | 1/2015 | Yahr et al. |
| 9,535,429 | B2 | 1/2017 | Marty et al. |
| 9,650,769 | B2 | 5/2017 | Peel |
| 9,650,770 | B2 | 5/2017 | Peel |
| 10,012,318 | B2 | 7/2018 | Morgan et al. |
| 10,088,063 | B2 | 10/2018 | Lopez |
| 10,088,851 | B2 | 10/2018 | Huck et al. |
| D886,236 | S | 6/2020 | Pfund et al. |
| 10,823,296 | B2 | 11/2020 | Fratantonio et al. |
| 10,900,577 | B2 | 1/2021 | Christenson |
| D958,937 | S | 7/2022 | Pfund et al. |
| 11,448,328 | B2 | 9/2022 | Caleffi |
| 11,852,251 | B2 | 12/2023 | Hashimoto et al. |
| D1,021,000 | S | 4/2024 | Bouchard et al. |
| 2004/0149831 | A1 | 8/2004 | Sheeran et al. |
| 2013/0340848 | A1 | 12/2013 | Peel |
| 2025/0361941 | A1 | 11/2025 | Esmaili |

FOREIGN PATENT DOCUMENTS

| | | |
|---|---|---|
| GB | 2263755 A | 8/1993 |
| WO | 0212760 | 2/2002 |

OTHER PUBLICATIONS

Spirax Sarco Products, “Control Hardware Electric-Pneumatic Actuation”, 2022, 27 pages.

Bhatia, A., “Control Valve Basics: Sizing and Selection”, Course No. M04-034, Credit: 4 PDH, CED Engineering.com, 2014, 64 pages.

Johnson Controls, Inc, “Valves”, Valve and Actuator Manual, 1994, 32 pages.

International Search Report and Written Opinion corresponding to Application No. PCT/US2025/029347, dated Jul. 30, 2025, 10 pages.

* cited by examiner 10
12
540
542
104
100
200
14

200
520
230
240
252
252
244
250
250
540
542
252
250
530
242
542
104
100

250
252
244
202
230
530
104
100
242
252
250
542
540
520
240
200
252
250
542

200
250
540
252
542
210
420
480
216
208
244
230
240
8
100
104
102
530
242
202
520
7

100
104
102
530
510
222
244
210
252
208
250
MIXED WATER
216
218
230
500
520
212
254
250
HOT WATER
204
240
252
410
242
206
252
254
214
250
COLD WATER

COLD WATER
208
210
222
19
102
COLD WATER
214
410
400
212
216
218

102
480
214
208
216
222
410
210
212
218
HOT WATER
HOT WATER 410
13
484
480
450
486
458
428
420
486
482
13

484
480
486
450
492
458
428
420
486
482

420
428
486
492
486
458
450
484

480
486
454
452
450
456
458
428
426
422
420
424
486

HOT WATER MIXING VALVE

TECHNICAL FIELD OF THE DISCLOSURE

The present disclosure generally relates to fluid control valves and, more particularly, to hot water mixing valves. Even more particularly, the present disclosure relates to an electronic hot water mixing valve that adjusts the temperature of hot water accurately and quickly, while providing a constant flow rate of the hot water.

BACKGROUND OF THE DISCLOSURE

In commercial and residential settings, hot water temperature control is important to prevent scalding and ensure efficient operation of the water system and a reliable and consistent supply of hot water at a relatively constant flow rate.

What is still desired is a new and improved electronic hot water mixing valve ("MV"). Preferably the electronic MV will adjust the temperature of hot water accurately and quickly, while providing a constant flow rate of the hot water.

SUMMARY OF THE DISCLOSURE

The present disclosure provides a new and improved hot water mixing valve ("MV"). According to one exemplary embodiment, the MV includes a body having a first inlet and a second inlet, an outlet, and a mixing chamber. A first passageway connects the first inlet to the mixing chamber, a second passageway connects the second inlet to the mixing chamber, and a third passageway connects the mixing chamber to the outlet. A first valve seat is located between the first passageway and the mixing chamber, and a second valve seat is located between the second passageway and the mixing chamber.

The MV also includes a shuttle located in the mixing chamber between the first and second valve seats. The shuttle is movable from a first position where the shuttle contacts the first valve seat to block fluid flow at least partially from the first passageway into the mixing chamber and a second position where the shuttle contacts the second valve seat to block fluid flow at least partially from the second passageway into the mixing chamber.

The shuttle includes first and second plugs. The first plug faces towards the first valve seat and has a trim surface extending between a distal end and a proximal end, the proximal end being spaced further from the first valve seat than the distal end. An outer diameter of the trim surface is larger at the proximal end than at the distal end. The second plug faces towards the second valve seat and has a trim surface extending between a distal end and a proximal end, the proximal end of the second plug being spaced further from the second valve seat than the distal end of the second plug. An outer diameter of the trim surface of the second plug is larger at the proximal end of the second plug than at the distal end of the second plug.

The trim surfaces of the plugs are one of, or a combination of, a fast-opening shape, a linear shape, and an equal percentage shape. According to one exemplary embodiment, the trim surface of the first plug and the second plug has an equal percentage shape.

According to another exemplary embodiment, the trim surfaces of the first plug and the second plug have the same shape. According to an additional exemplary embodiment, the first plug and the second plug are separate pieces and are secured such that the proximal ends of the plugs touch.

According to additional exemplary features, the body includes a central conduit extending between first and second open ends. The central conduit defines the mixing chamber. A first sleeve insert is received in the first open end of the central conduit and partially defines the first passageway, and an end of the first sleeve insert defines the first valve seat. A second sleeve insert is received in the second open end of the central conduit and partially defines the second passageway, and an end of the second sleeve insert defines the second valve seat. A first end cap closes the first open end of the central conduit and defines a bore, and a second end cap closes the second open end of the central conduit and defines a bore.

The shuttle further includes a stem having a first end and a second end, and the plugs are located on the stem. The first end of the stem is slidingly received in the bore of the first end cap and the second end of the stem is slidingly received in the bore of the second end cap. The shuttle can be pushed towards one of the valve seats and pulled towards the other of the valve seats.

According to one exemplary embodiment, an assembly including the MV also includes an actuator connected to one of the ends of the stem of the shuttle. According to one exemplary embodiment, the actuator is a linear actuator. According to another exemplary embodiment, the actuator includes a stepper motor.

According to another exemplary embodiment, the assembly also includes a temperature sensor located in the third passageway, and a controller connected to the temperature sensor and the actuator and programmed to instruct the actuator to move the shuttle based at least in part on data received by the controller from the temperature sensor. According to a further exemplary embodiment, the controller is programmed to slow the speed of the actuator as the plugs approach the valve seats.

Among other aspects and advantages, the new and improved electronic MV of the present disclosure adjusts the temperature of hot water accurately and quickly, while providing a constant flow rate of the hot water.

Additional aspects and advantages of the present disclosure will become readily apparent to those skilled in this art from the following detailed description, wherein only an exemplary embodiment of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

Reference is made to the attached drawings, wherein elements having the same reference character designations represent like elements throughout, and wherein.

DETAILED DESCRIPTION OF EXEMPLARY EMBODIMENTS

Figures 1, 2:
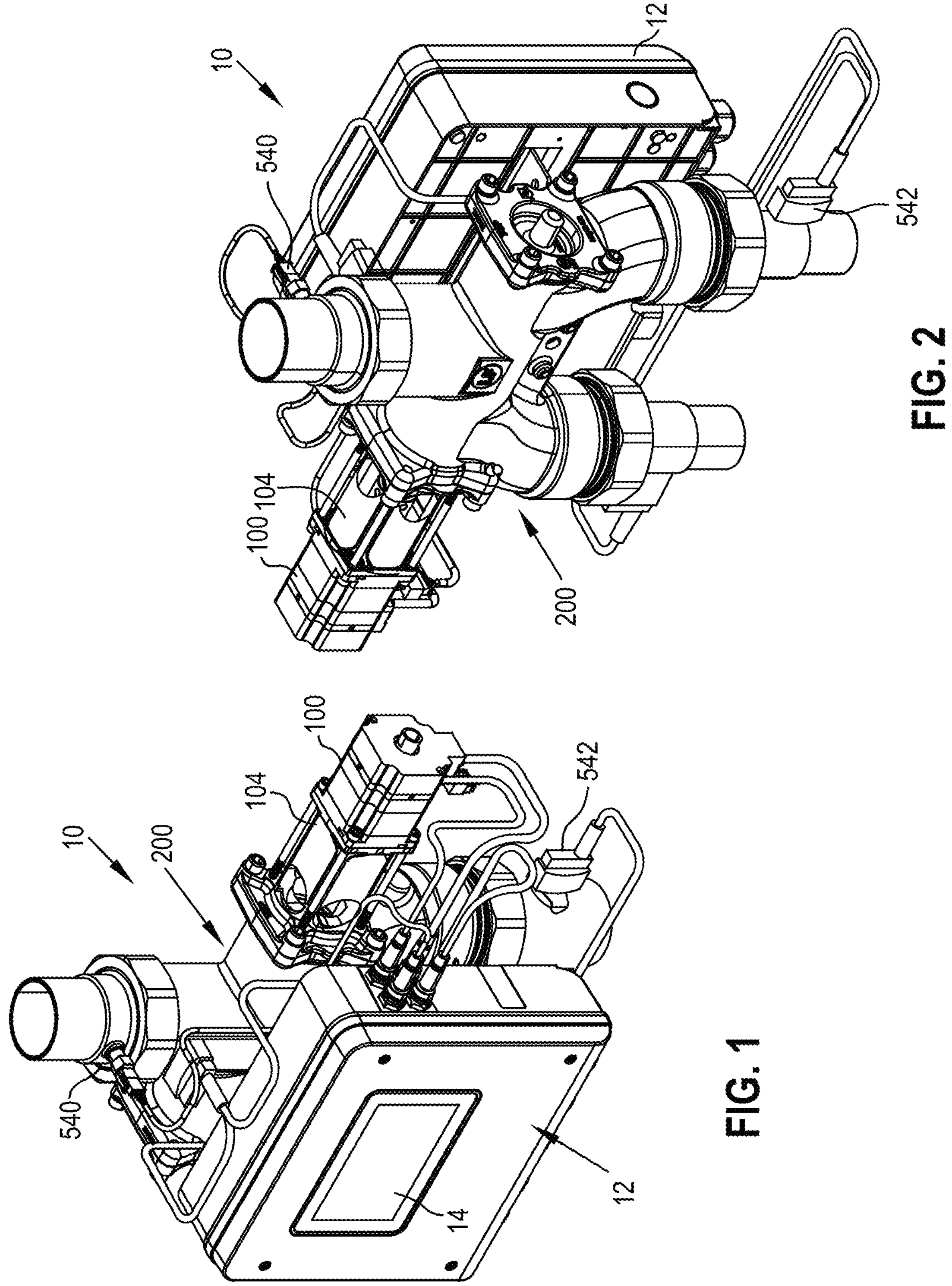
FIG. 1 is a top, front and first side perspective view of an exemplary embodiment of an electronic hot water mixing valve ("MV") assembly constructed in accordance with the present disclosure.
FIG. 2 is a top, rear and second side perspective view of the electronic MV assembly of FIG. 1.
Figure 3:
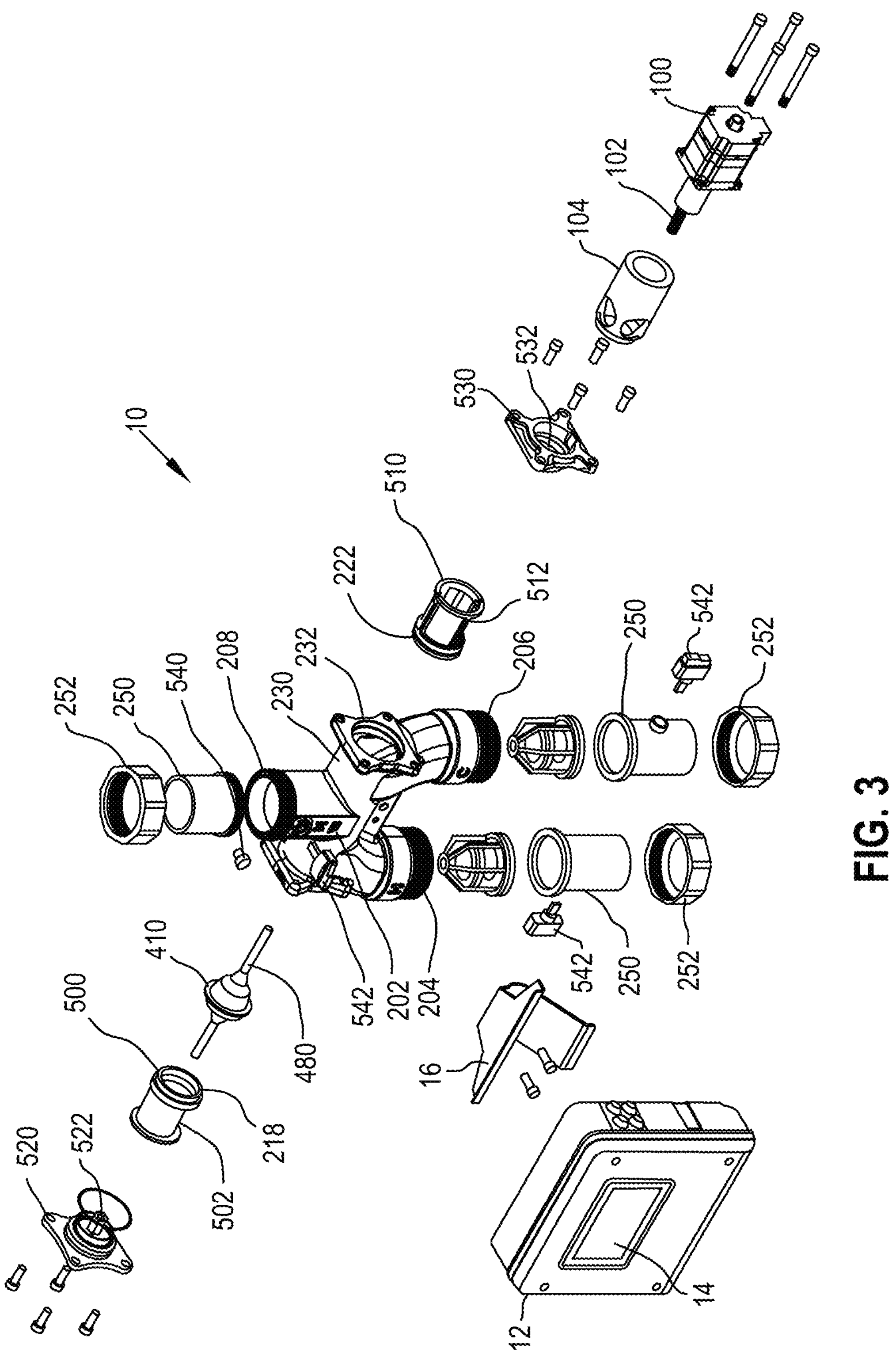
FIG. 3 is a top, front and first side perspective and exploded view of the electronic MV assembly of FIG. 1.
Figures 4, 5:
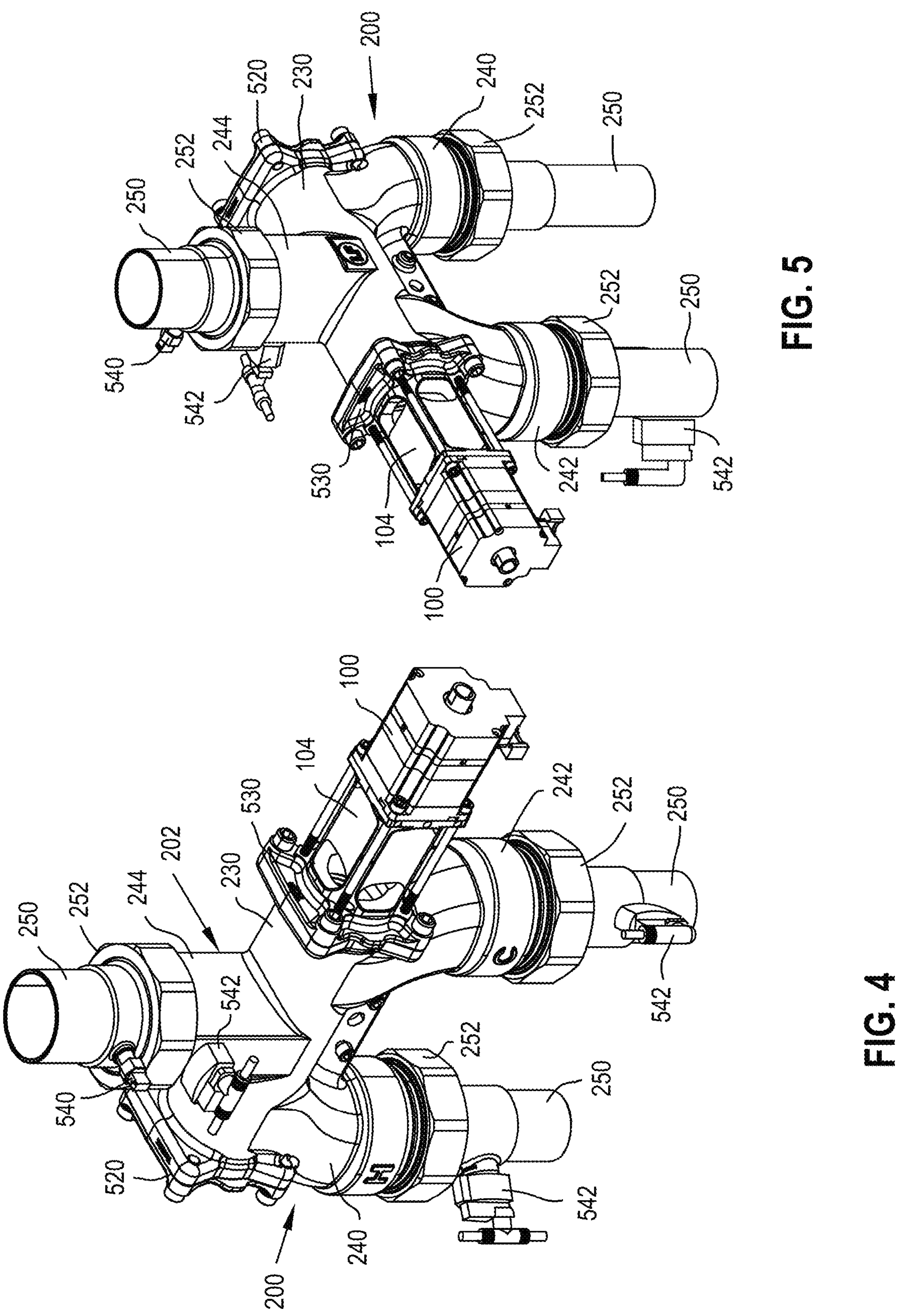
FIG. 4 is a top, front and first side perspective view of an exemplary embodiment of an MV of the assembly of FIG. 1.
FIG. 5 is a top, rear and second side perspective view of the MV of FIG. 4.
Figures 6, 7:
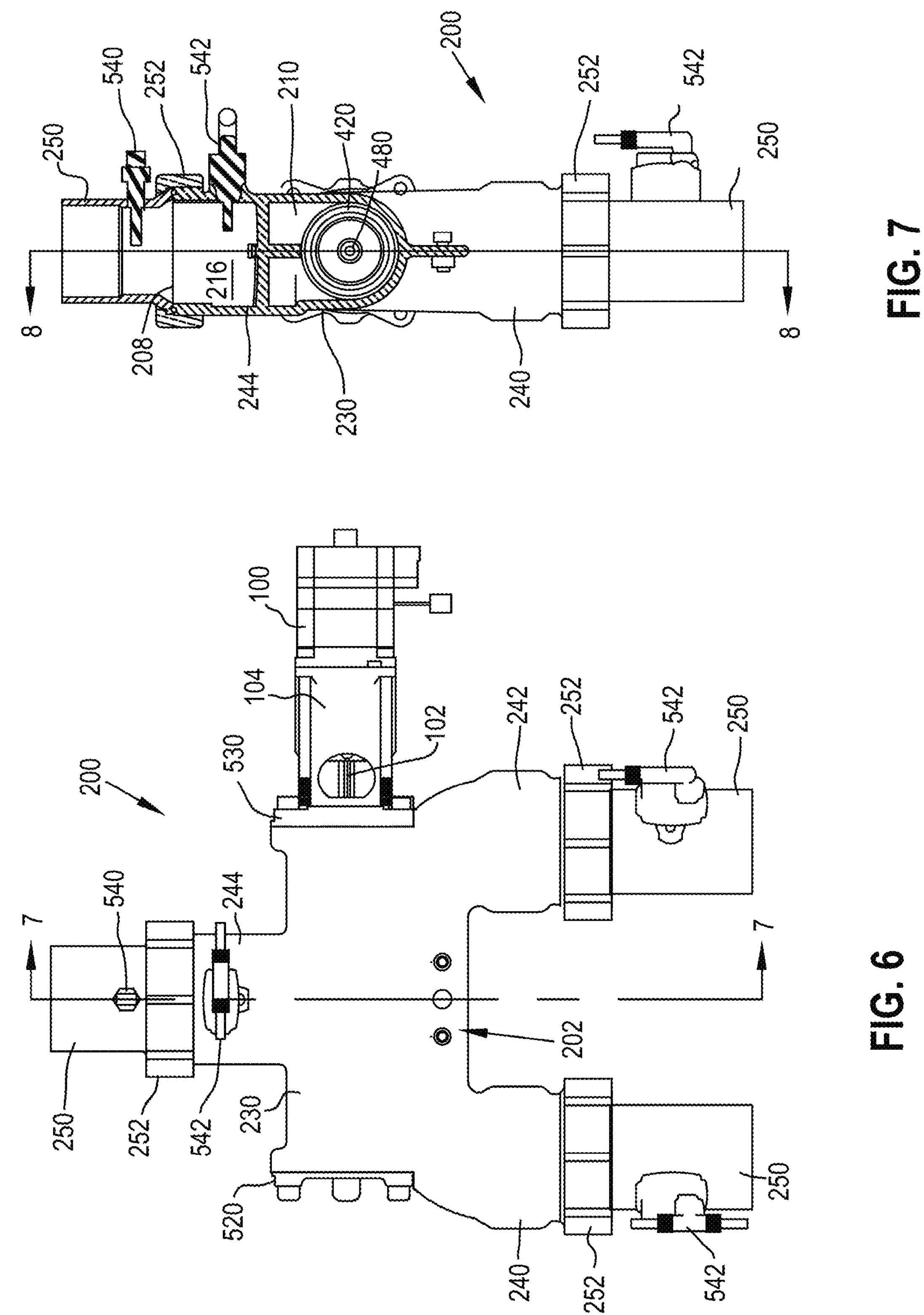
FIG. 6 is a front plan view of the MV of FIG. 4.
FIG. 7 is a sectional view of the MV of FIG. 4 taken along line A-A of FIG. 6.

Referring to the figures, an exemplary embodiment of a new and improved electronic hot water mixing valve ("MV") assembly 10 according to the present disclosure is shown. Among other benefits, the new and improved MV assembly 10 of the present disclosure is easy to maintain and disassembly for servicing and replacement of internal parts. The MV assembly 10 of the present disclosure accurately and quickly mixes hot and cold water while providing mixed water at a constant flow rate. Referring to FIGS. 1 through 3, the MV assembly 10 includes a controller 12, an actuator 100, and a mixing valve ("MV") 200.

Referring also to FIGS. 4 through 15, the MV 200 includes a body 202 and a shuttle assembly 400 received in the body 202. The shuttle assembly 400 is advantageously easy to remove from, and install into the body 202, for servicing and replacement.

The body 202 has a first inlet 204 and a second inlet 206, an outlet 208. As shown best in FIGS. 7 through 10, the body 202 also includes a mixing chamber 210, a first passageway 212 connecting the first inlet 204 to the mixing chamber 210, a second passageway 214 connecting the second inlet 206 to the mixing chamber 210, and a third passageway 216 connecting the mixing chamber 210 to the outlet 208. A first valve seat 218 is located between the first passageway 212 and the mixing chamber 210, and a second valve seat 222 is located between the second passageway 214 and the mixing chamber 210.

As shown in FIGS. 3 and 7 through 15, a shuttle 410 of the shuttle assembly 400 is in the mixing chamber 210 between the first and second valve seats 218, 222. The shuttle 410 is movable from a first position, shown in FIG. 9, where the shuttle 410 contacts the first valve seat 218 to block fluid flow at least partially from the first passageway 212 into the mixing chamber 210 and a second position, shown in FIG. 10, where the shuttle 410 contacts the second valve seat 222 to block fluid flow at least partially from the second passageway 214 into the mixing chamber 210.

Figure 8:
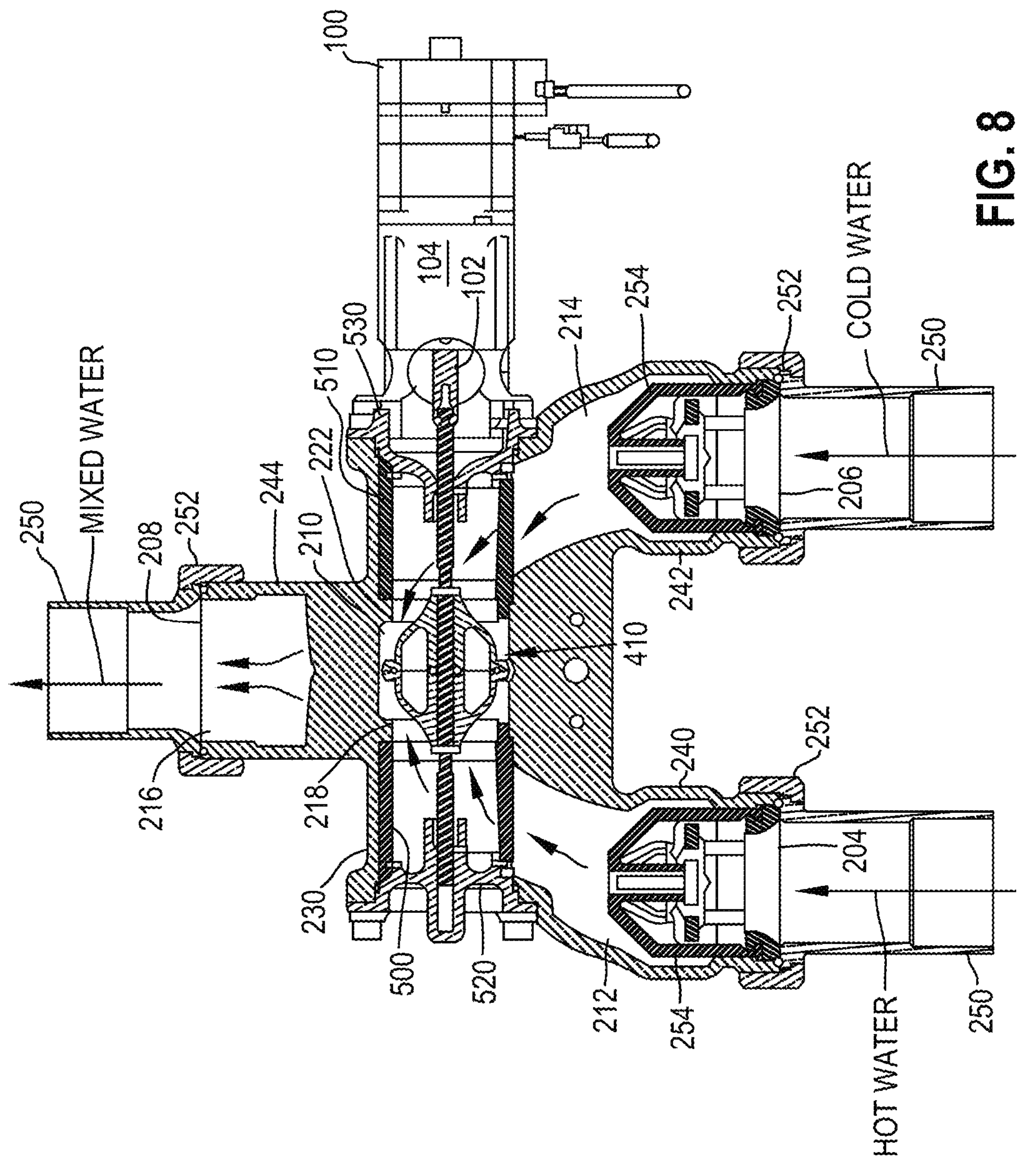
FIG. 8 is a sectional view of the MV of FIG. 4 taken along line B-B of FIG. 7, wherein a shuttle of the MV is shown in a mid-mix position equally spaced from first and second valve seats.
Figures 9, 10:
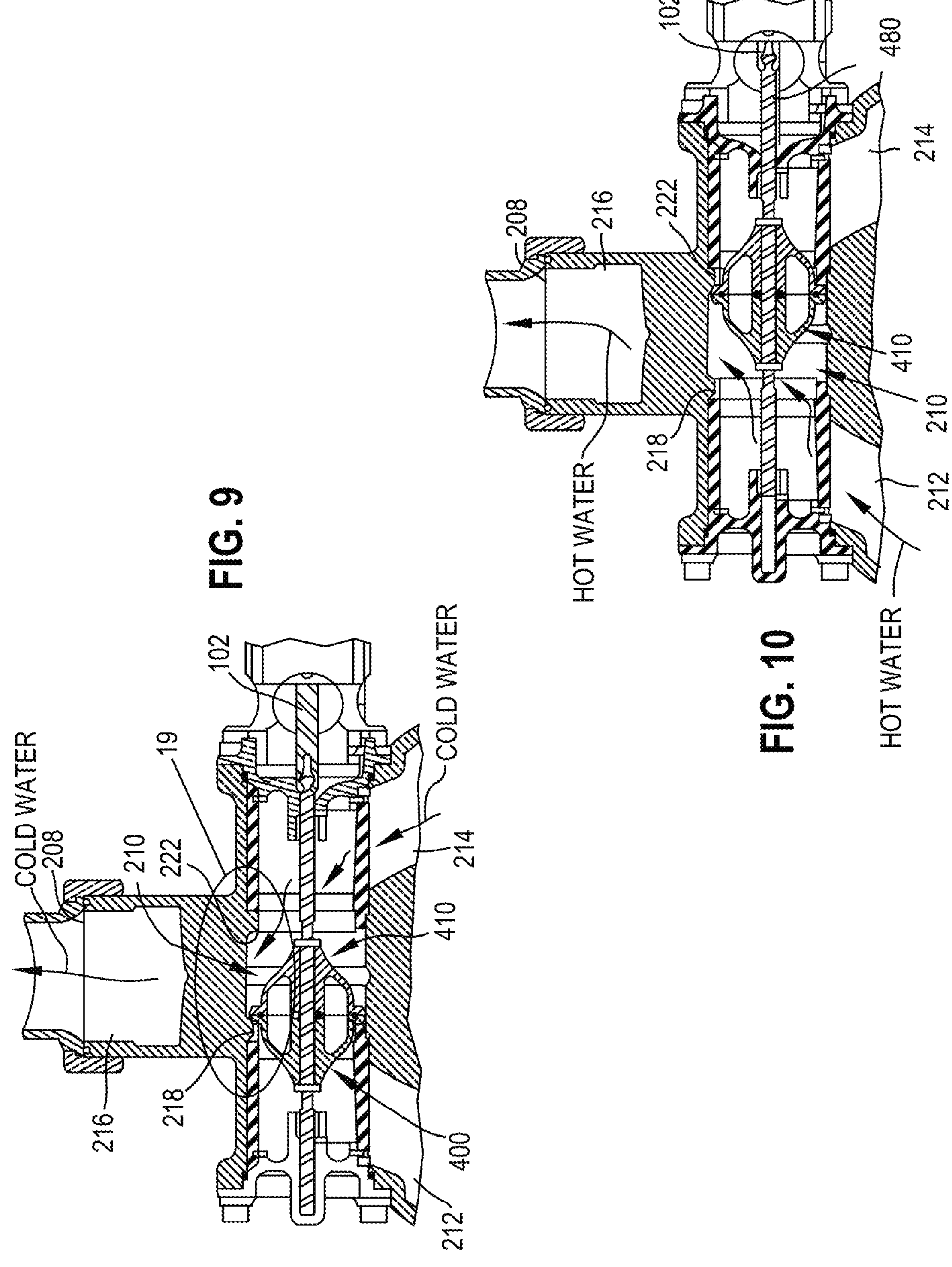
FIG. 9 is a partial sectional view of the MV of FIG. 4 taken along line B-B of FIG. 7, wherein the shuttle of the MV is shown in a full cold position blocking the first (hot water) valve seat.
FIG. 10 is a partial sectional view of the MV of FIG. 4 taken along line B-B of FIG. 7, wherein the shuttle of the MV is shown in a full hot position blocking the second (cold water) valve seat.
Figure 11:
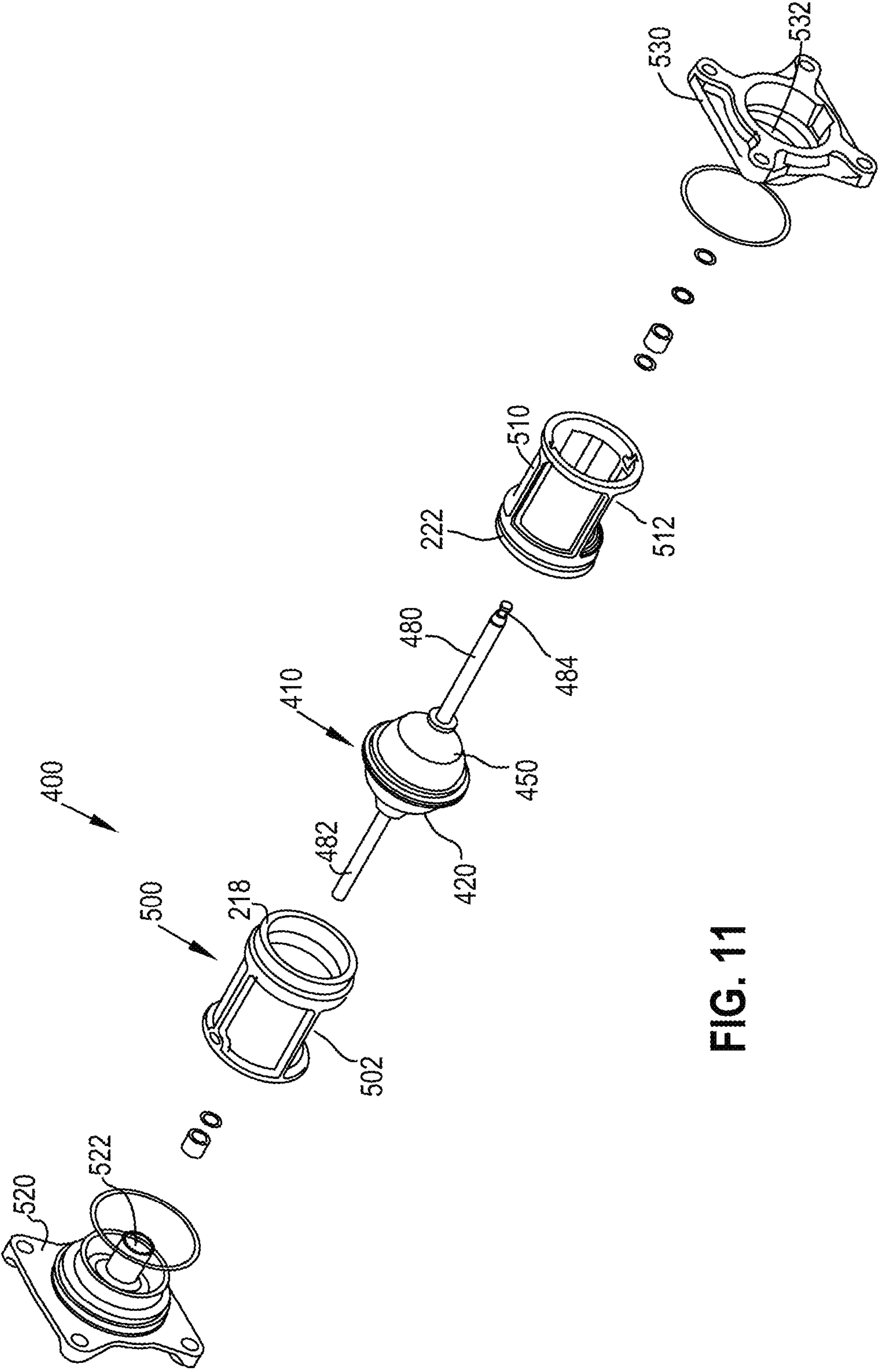
FIG. 11 is an exploded perspective view of a shuttle assembly of the MV of FIG. 4.
Figures 12, 13, 14, 15:
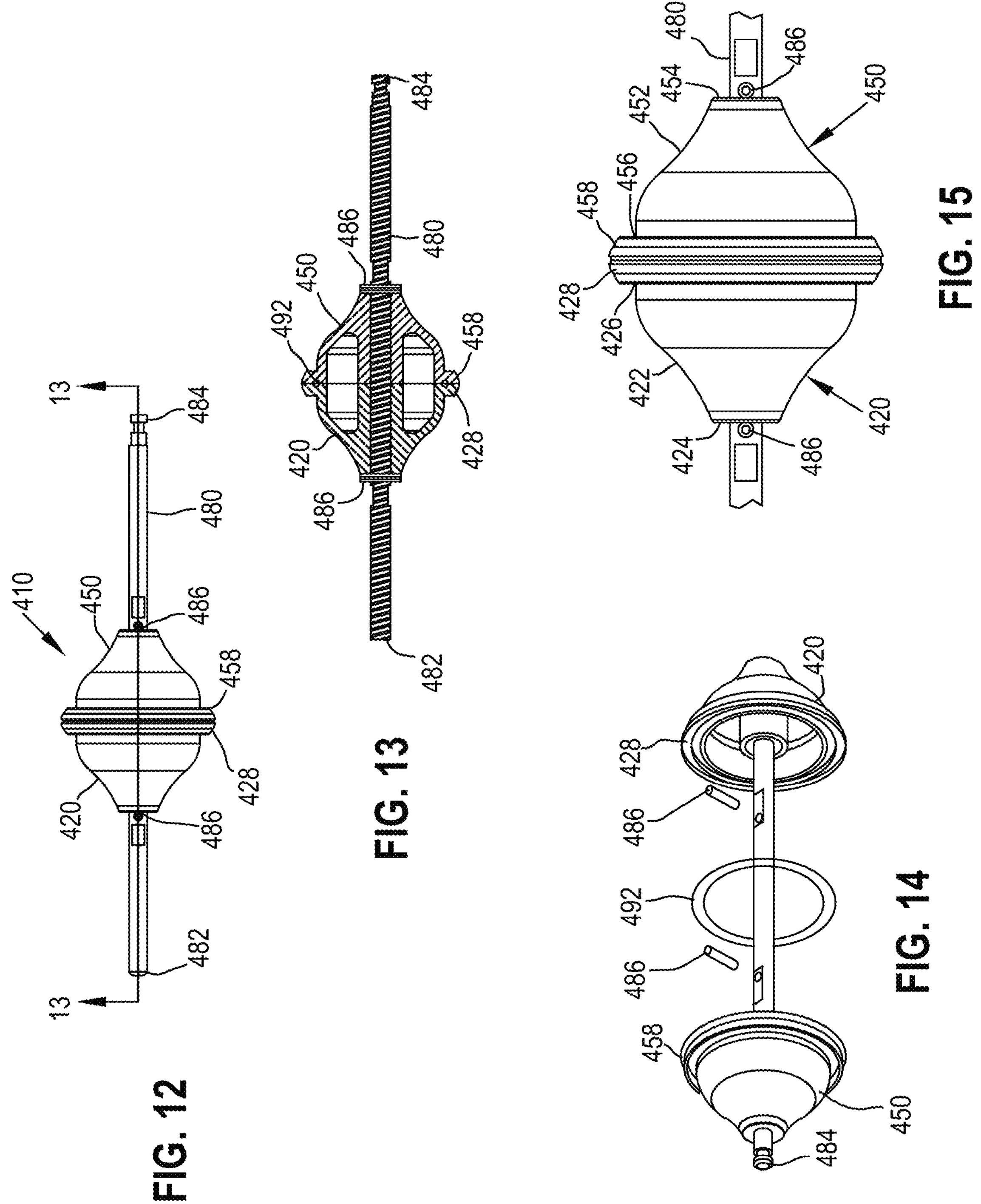
FIG. 12 is a plan view of the shuttle of the MV of FIG. 4.
FIG. 13 is a sectional view of the shuttle of the MV of FIG. 4, taken along line A-A of FIG. 12.
FIG. 14 is an exploded perspective view of the shuttle of the MV of FIG. 4.
FIG. 15 is an enlarged plan view of plugs of the shuttle of the MV of FIG. 4.

In the example shown in FIGS. 8 through 10, the first inlet 204 and the first passageway 212 are used to deliver hot water to the mixing chamber 210, while the second inlet 206 and the second passageway 214 are used to deliver cold water to the mixing chamber 210. The third passageway 216 and outlet 208 are used to deliver mixed water from the mixing chamber 210. Arrows show the flow of hot water, cold water and mixed water. The temperature of the mixed water delivered to the outlet 208 will vary depending on the mix of hot and cold water produced by the position of the shuttle 410 between the first and the second valve seats 218, 222. In FIG. 8, the shuttle 410 is shown in a mid-mix position equally spaced from the first and the second valve seats, while in FIG. 9 the shuttle 410 is shown in a full cold position blocking the first (hot water) valve seat, and in FIG. 10 the shuttle 410 is shown in a full hot position blocking the second (cold water) valve seat. It should be noted that, in an alternative embodiment, hot water can be directed to the second inlet 206 and cold water to the first inlet 204.

Referring to FIGS. 8-15, the shuttle 410 includes a first plug 420 and a second plug 450. The first plug 420 faces towards the first valve seat 218 and has a trim surface 422 extending between a distal end 424 and a proximal end 426. The proximal end 426 is spaced further from the first valve seat 218 than the distal end 424. In the example shown, an outer diameter of the trim surface 422 is larger at the proximal end 426 than at the distal end 424. However, in alternative embodiments, the outer diameter of the trim surface 422 can vary between the ends depending upon the plug used and its shape.

The second plug 450 faces towards the second valve seat 222 and has a trim surface 452 extending between a distal end 454 and a proximal end 456. The proximal end 456 of the second plug 450 is spaced further from the second valve seat 222 than the distal end 454 of the second plug 450. In the example shown, an outer diameter of the trim surface 452 of the second plug 450 is larger at the proximal end 456 of the second plug 450 than at the distal end 454 of the second plug 450. However, in alternative embodiments, the outer diameter of the trim surface 452 of the second plug 450 can vary between the ends depending upon the plug used and its shape.

The trim surfaces 422, 452 of the plugs 420, 450 can be one of, or a combination of, a fast-opening shape, a linear shape, and an equal percentage shape. A fast-opening shape will give a large change in flowrate for a small movement of the plug from a closed position against the valve seat, while a linear shape will produce a flowrate that is directly proportional to the plug movement. And an equal percentage shape increases the flowrate by a certain percentage of the previous flow for each increment of plug movement so that the relationship between plug movement and flowrate is not linear but logarithmic.

In the exemplary embodiment shown, the trim surfaces 422, 452 of the plugs 420, 450 have an equal percentage shape, and the trim surfaces 422, 452 of the plugs 420, 450 have the same shape and have the same size. In other words, the plugs 420, 450 are identical. It should be noted, however, that the trim surfaces 422, 452 could have different shapes and the plugs 420, 450 could be of different sizes. For example, trim surface 422 of the first plug 420 could have a linear shape and the trim surface 452 of the second plug 450 could have an equal percentage shape. Or the trim surfaces 422, 452 could each have a linear shape, but the plugs 420, 450 could be of different sizes.

In the exemplary embodiment shown, the valve seats 218, 222, and their resulting openings, are the same size and shape. But in alternative embodiments, the valve seats 218, 222 can be sized or shaped differently. In the exemplary embodiment shown, a flow from the first passageway 212 into the mixing chamber 210 and a flow from the second passageway 214 into the mixing chamber 210 are equal when the shuttle 410 is equally positioned between the valve seats 218, 222, as is shown in FIG. 8. But in alternative embodiments, the flows could be different when the shuttle 410 is equally positioned between the valve seats 218, 222.

In the exemplary embodiment shown, the first plug 420 and the second plug 450 are separate pieces and are secured together such that the proximal ends 426, 456 of the plugs 420, 450 touch. In alternative embodiments, the plugs 420, 450 can be spaced apart, or the plugs 420, 450 can be unitarily formed as a single piece.

In the exemplary embodiment shown, the first plug 420 includes a radially extending flange 428 at the proximal end 426 for contacting the first valve seat 218 when the shuttle 410 is in the first position, and the second plug 450 includes a radially extending flange 458 at the proximal end 456 of the second plug 450 for contacting the second valve seat 222 when the shuttle 410 is in the second position. In this exemplary embodiment, the flange 428 of the first plug 420 fully blocks fluid flow from the first passageway 212 into the mixing chamber 210 when the shuttle 410 is in the first position, as shown in FIG. 9, and the flange 458 of the second plug 450 fully blocks fluid flow from the second passageway 214 into the mixing chamber 210 when the shuttle 410 is in the second position, as shown in FIG. 10. In alternative embodiments, the flows from the first and the second passageways 212, 214 do not have to be fully closed when the shuttle 410 is in one of the first and the second positions.

Figures 16, 17:
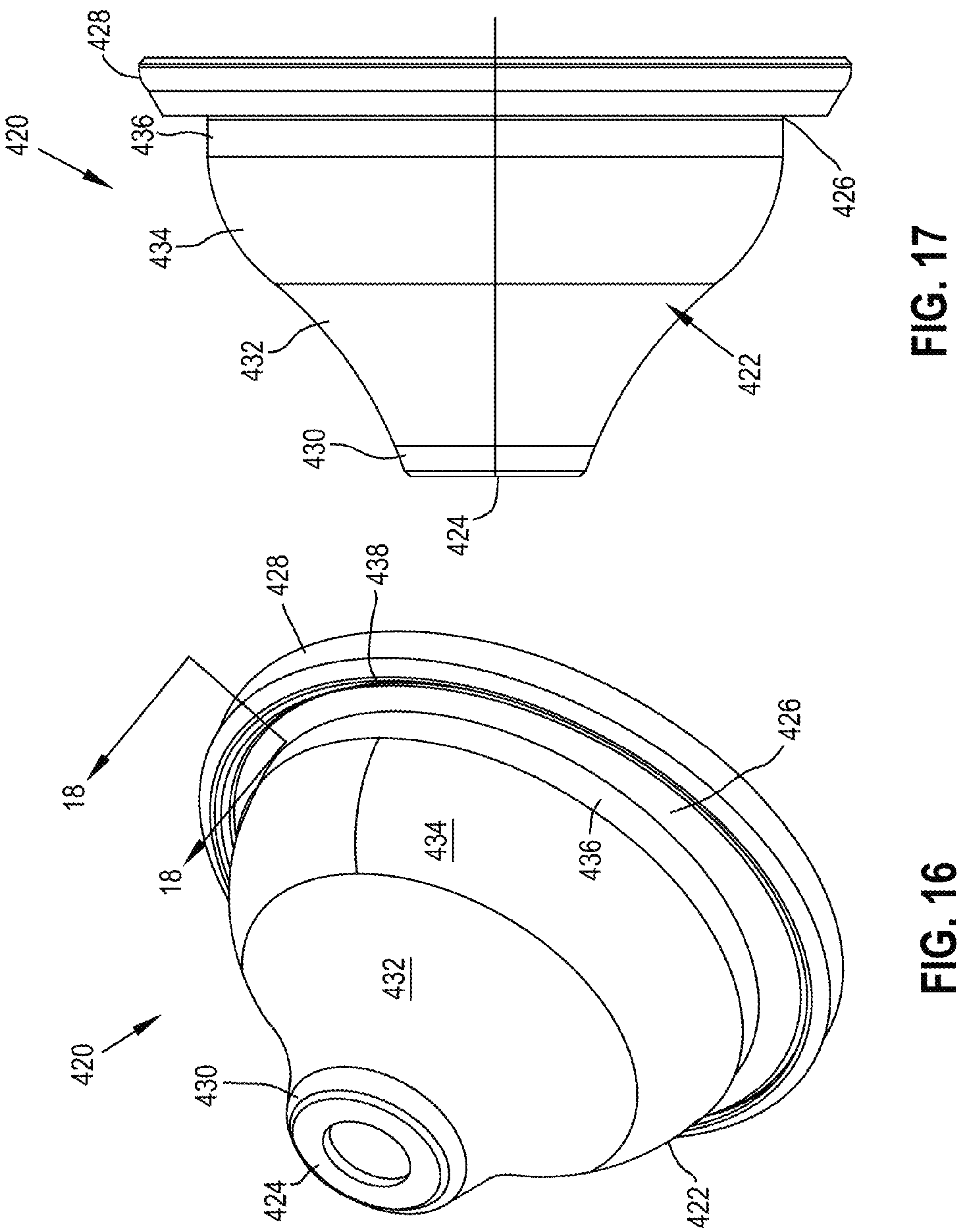
FIG. 16 is an enlarged perspective view of a plug of the shuttle of the MV of FIG. 4.
FIG. 17 is a side elevation view of the plug of FIG. 16.
Figure 18:
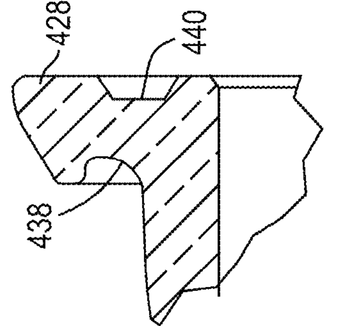
FIG. 18 is an enlarged sectional view of a portion of the plug taken along line A-A of FIG. 16.

FIGS. 16 through 18 provide enlarged views of one of the two identical plugs 420, 450. As mentioned, the trim surfaces 422, 452 of the plugs 420, 450 have equal percentage shapes. In the embodiment shows, the distal end 424 has a flat face, and the trim surface 422 has four consecutive sections 430-436. A first section 430 extends from the distal end 424 and has a concave profile, a second section 432 has a concave profile, a third section 434 has a convex profile, and a fourth section 436 has a flat profile and extends to the proximal end 426.

According to one exemplary embodiment, the outer diameter of the fourth section 436 is 1.715 inches, while the outer diameter of the distal end 424 is 0.53 inches. The overall length of the plug 420, including the flange, is 1.232 inches. The length of the first section 430 is 0.092 inches, the length of the second section 432 is 0.48 inches, the length of the third section 434 is 0.37 inches, and the length of the fourth section 436 is 0.29 inches. The convex profile of the second section 432 has a radius of 1.2 inches, while the convex profile of the third section 434 has a radius of 0.5 inches.

FIG. 18 shows an exemplary embodiment of the flange 428 of the plug 420, wherein the flange includes a distal facing groove 438 and a proximal facing groove 440. The flange 428 has an outer diameter of 2.095 inches.

Referring to FIGS. 12 through 15, the shuttle 410 further comprises a stem 480 having a first end 482 and a second end 484, and the plugs 420, 450 are located on the stem. In one exemplary embodiment, the stem 480 is made of stainless steel and the plugs 420, 450 are made of a suitable polymer, such as Noryl® resin. The plugs 420, 450 are secured on the stem 480 with pins 484, and an o-ring 488, a spacer 490 and a seal 492 are located between the plugs 420, 450. The seal 492 is received in the proximal facing grooves 440, 470 of the plugs 420, 450.

In the exemplary embodiment shown, the body 202 further includes a central conduit 230 extending between first and second open ends 232, 234, as shown best in FIGS. 8 through 10, and the central conduit 230 defines the mixing chamber 210. The shuttle assembly 400, as shown best in FIGS. 1 through 10 and 11, includes the shuttle 410 and further includes a first sleeve insert 500 received in the first open end 232 of the central conduit 230, a second sleeve insert 510 is received in the second open end 234 of the central conduit 230, a first end cap 520 closing the first open end 232 of the central conduit 230, and a second end cap 530 closing the second open end 234 of the central conduit 230.

The first sleeve insert 500 partially defines the first passageway 212 through a side opening 502 of the sleeve insert. An end of the first sleeve insert 500 defines the first valve seat 218. The second sleeve insert 510 partially defines the second passageway 214 through a side opening 512 in the second sleeve insert. An end of the second sleeve insert 510 defines the second valve seat 222. The sleeve inserts 500, 510 are made of plastic and the valve seats 218, 222 are made of a polymer over-molded onto the sleeve inserts.

Figure 19:
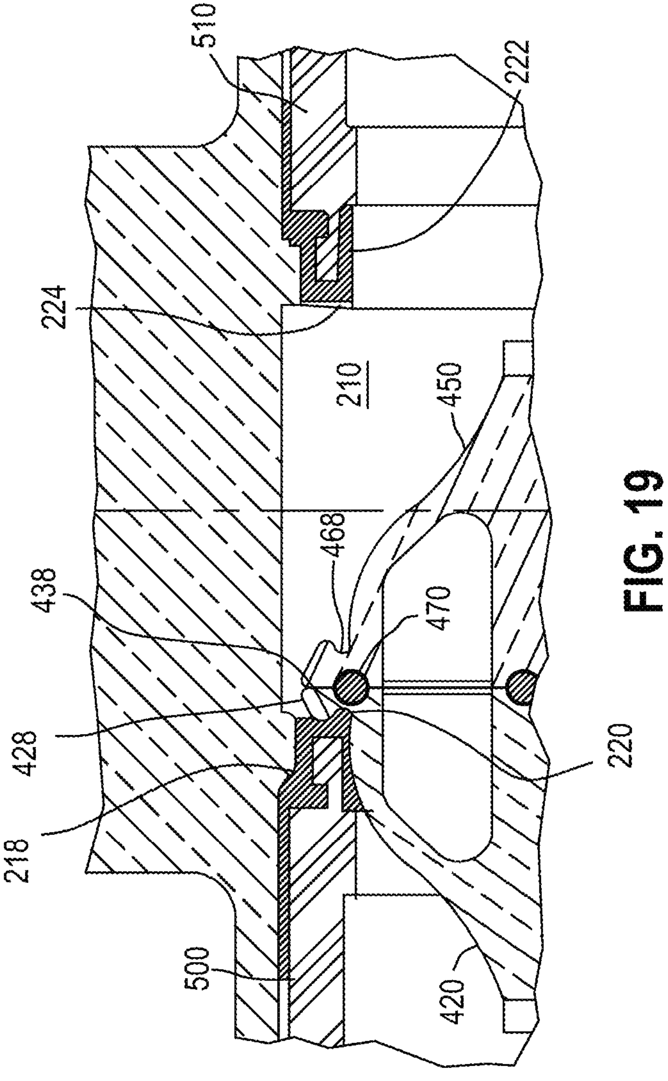
FIG. 19 is an enlarged view of a portion of the MV contained in circle "19" in FIG. 9.

As shown best in FIG. 19, the valve seats 218, 222 each include an extending lip 220, 224. The lips 220, 224 are received in the distal facing grooves 438, 468 of the flanges 428, 458 of the plugs 420, 450 when the shuttle 410 is in the first position (FIG. 9) or the second position (FIG. 10).

As shown best in FIG. 8-11, the first end cap 520 has a bore 522, and the second end cap 530 has a bore 532. The first end 482 of the stem 480 of the shuttle 410 is slidingly received in the bore 522 of the first end cap 520, and the second end 484 of the stem 480 is slidingly received in the bore 532 of the second end cap 530.

In the example shown, the second end 484 of the stem 480 extends through the bore 532 of the second end cap 530. The actuator 100 includes a screw 102 secured to the second end 484 of the stem 480 of the shuttle 410, so that the actuator 100 can push the shuttle 410 towards the first valve seat 218 or pull the shuttle 410 towards the second valve seat 222. The actuator 100 is a linear actuator having a stepper motor. According to one example, the actuator 100 is a NEMA 23, captive linear stepper motor, model number 23K2113F4-175SMSEK-WWT-001 (04), supplied by Ding's Motion USA. The actuator 100 also includes a mounting adapter 104 secured between the second endcap 530 and the actuator.

The electronic hot water MV assembly 10 includes a temperature sensor 540 located in the third passageway 216, and the controller 12 is connected to the temperature sensor 540 and the actuator 100. The controller 12 is programmed to instruct the actuator 100 to move the shuttle 410 based at least in part on data received by the controller 12 from the temperature sensor 540.

Figure 20:
FIG. 20is a graph of flowrate versus temperature versus shuttle position for a two-inch version of the electronic MV assembly of FIG. 1.
Figure 20:
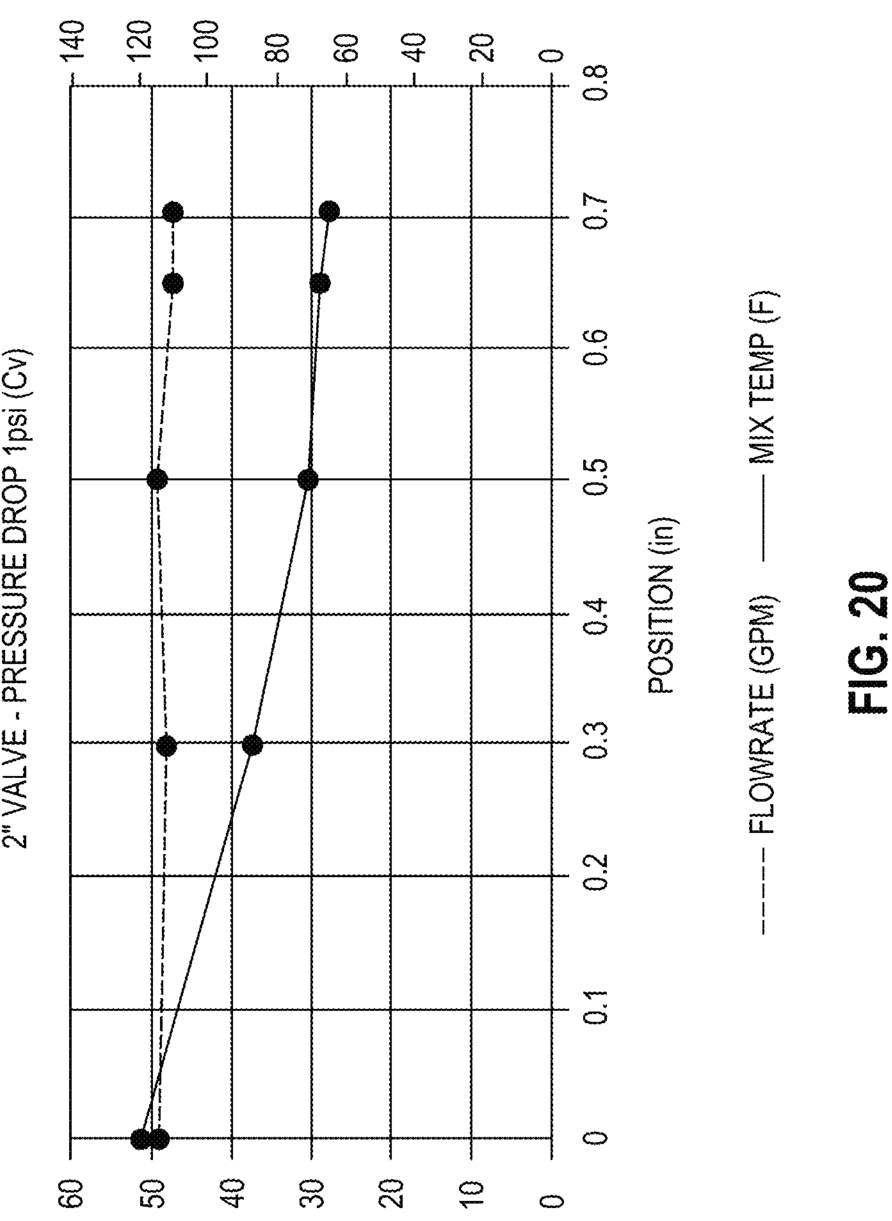

A graph provided in FIG. 20 shows a flowrate and a temperature of water discharged (i.e., from outlet 208) by a two-inch version of the MV assembly 10 according to the present disclosure. The flowrate and the temperature are plotted versus the position of the shuttle 410 in the mixing chamber 210 between the valve seats 218, 222. As shown, the assembly 10 can change the temperature of the mixed water at the third passageway 216 while maintaining the flowrate of water passing through the third passageway.

Figure 21:
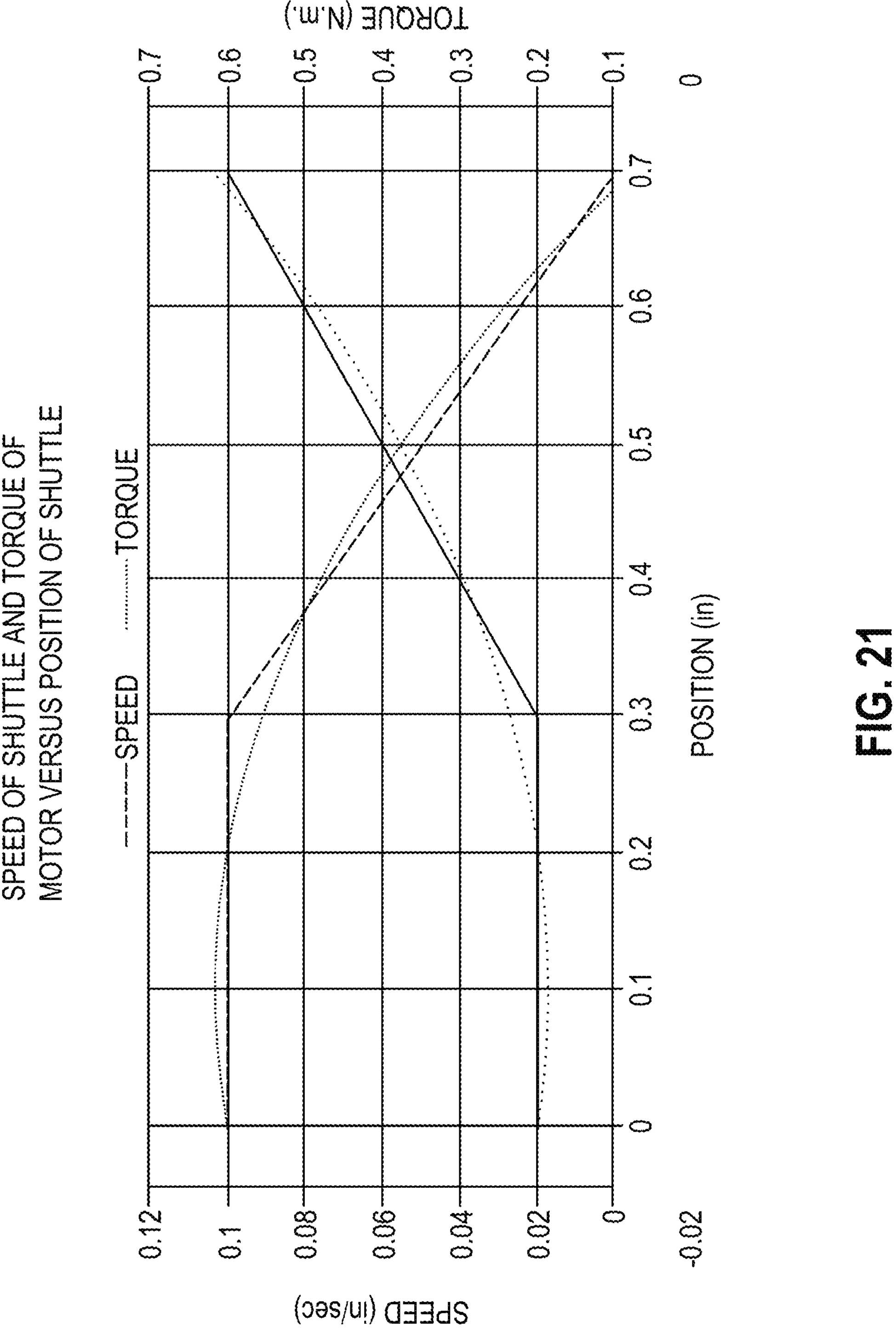
FIG. 21 is a graph of an exemplary embodiment of shuttle speed and motor torque versus shuttle position for the electronic MV assembly of FIG. 1.

FIG. 21 is a graph of an exemplary embodiment of shuttle 410 speed and motor (actuator 100) torque versus the shuttle 410 position within the mixing chamber 210 for the MV assembly 10 of FIG. 1. As illustrated by the graph, the controller 12 is programmed to slow the speed of the actuator 100 whenever the shuttle 410 approaches the first and the second valve seats 218, 222. For example, at the position of 0.7 inches on the graph is when the flange 428 of the first plug 420 reaches the first valve seat 218 or when the flange 458 of the second plug 450 reaches the second valve seat 222. Slowing the speed increases the motor torque so that the actuator 100 can effectively close the valve seats 218, 222.

The controller 12 has a touch screen display 14 that allows a user to setup and operate the MV assembly 10. The set point for the mixed water flow is programmable for a wide range of temperatures such as 60° F. to 180° F. In one embodiment, the display shows the date and time with the setpoint and current mixed water temperature. The MV assembly 10 maintains the setpoint within 2° F., for example. The controller 12 also includes memory for storing data such as error messages with associated date and time stamps, as well as a processor. The controller 12 is also Wi-Fi enabled. In one embodiment, the controller 12 has battery backup, which may be internal or external. Preferably, the controller 12 communicates with a building automation system for sending and receiving status and control information for remote monitoring. For example, high and low temperature alerts may be programmed into the controller 12.

The controller 12 is mounted to the MV 200 with a bracket 16, as shown in FIG. 3. The controller 12 is in communication with the temperature sensor 540 and the actuator 100 to monitor and control operation of the MV 200. The communication between the controller 12, the actuator 100, and the sensor 540 may be wireless and/or hard wired. In the shown embodiment, the controller, the sensor, and the actuator communicate with wires.

As shown in FIGS. 2 through 8, the body 202 of the MV 200 further includes a first leg 240 connected to the central conduit 230 and defining the first inlet 204 and partially defining the first passageway 212, a second leg 242 connected to the central conduit 230 and defining the second inlet 206 and partially defining the second passageway 214, and a third leg 244 connected to the central conduit 230 and defining the outlet 208 and the third passageway 216. The legs 240, 242, 244 extend substantially perpendicular to the central conduit 230. Tailpieces 250 are attached to the legs 240, 242, 244 with union nuts 252 to couple into a building's water network. As can be seen, additional sensors 542 can be mounted in the tailpieces 250 and the body 202 for sensing the temperature and the pressure of the water, and these sensors are also connected to the controller 12. The MV 200 also includes check modules 254 in the first and the second passageways 212, 214. The check modules may also include strainers to prevent contamination with particles that could impede the proper operation of the electronic MV assembly.

The components of the MV assembly 10 may be fastened together by threads, welding, epoxy, fasteners and the like not described in detail but plainly visible in the figures. Preferably, the body 202 of the MV has a lead-free construction, fabricated from material such as bronze, brass, stainless steel, polytetrafluoroethylene (PTFE), zinc plated steel, die cast aluminum, glass filled Noryl® resin and the like.

Figure 22:
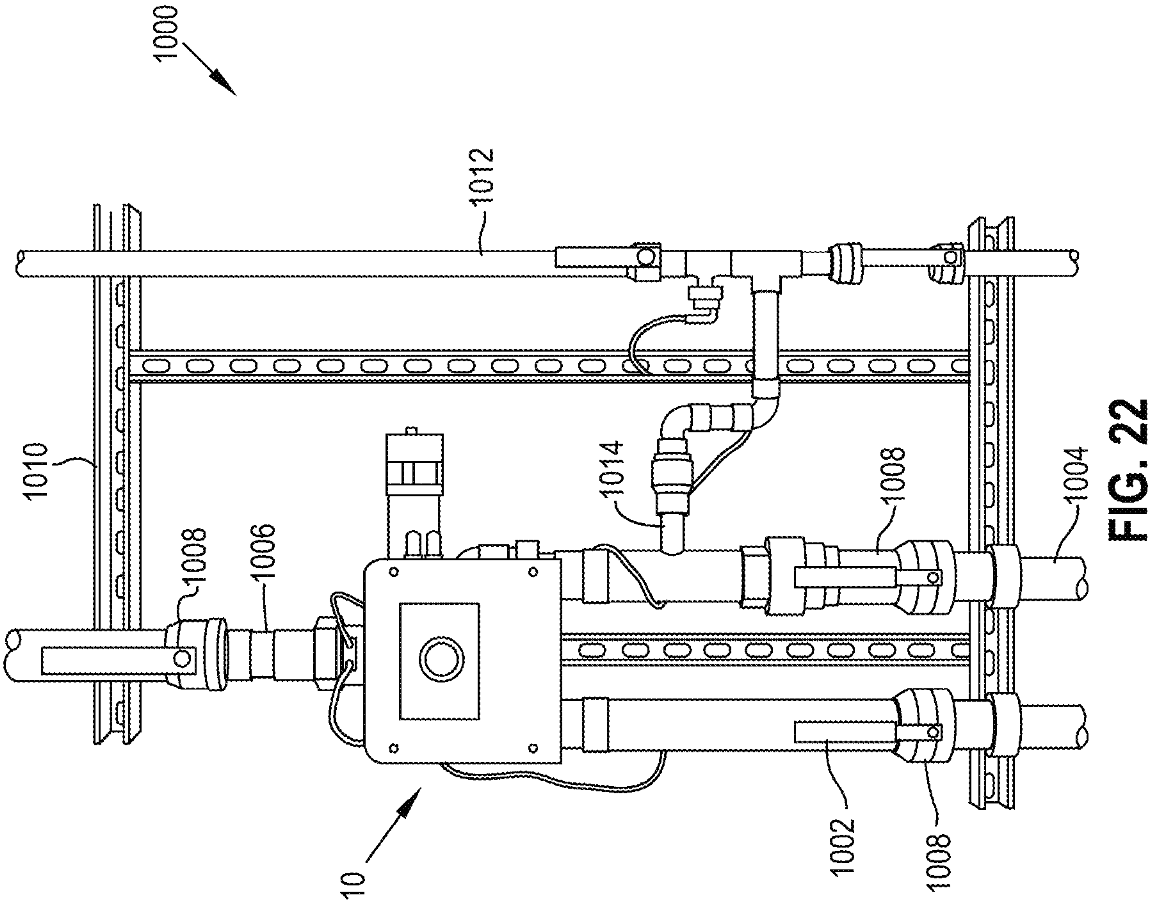
FIG. 22 is front plan view of an exemplary embodiment of a valve station constructed in accordance with the present disclosure, including the MV assembly of FIG. 1.

Referring to FIG. 22, there is shown a valve station 1000 including the MV assembly 10, and further including a hot water supply conduit 1002 connected to the first inlet 204 of the valve, a cold water supply conduit 1004 connected to the second inlet 206 of the valve, and a mixed water conduit 1006 connected to the outlet 208 of the valve. Shut-off valves 1008 are in the cold water, the hot water and the mixed water conduits. A frame 1010 supports the conduits and the MV assembly 10. And a recirculation water conduit 1012 is supported by the frame 1010, and a diversion conduit 1014 is connected between the recirculation water conduit 1012 and the cold water conduit 1004.

The present disclosure, therefore, provides a new and improved electronic hot water MV assembly 10. It should be understood, however, that the exemplary embodiment described in this specification has been presented by way of illustration rather than limitation, and various modifications, combinations and substitutions may be affected by those skilled in the art without departure either in spirit or scope from this disclosure in its broader aspects and as set forth in the appended claims. Accordingly, other embodiments are within the scope of the following claims. In addition, the MV assembly disclosed herein, and all elements thereof, are contained within the scope of at least one of the following claims. No elements of the presently disclosed MV assembly are meant to be disclaimed.

What is claimed is:

1. A valve comprising:
a body having,
a first inlet and a second inlet,
an outlet,
a mixing chamber,
a first passageway connecting the first inlet to the mixing chamber, and a second passageway connecting the second inlet to the mixing chamber,
a third passageway connecting the mixing chamber to the outlet,
a first valve seat located between the first passageway and the mixing chamber, and
a second valve seat located between the second passageway and the mixing chamber; and
a shuttle located in the mixing chamber and movable between the first and second valve seats, from a first position where the shuttle contacts the first valve seat to block fluid flow at least partially from the first passageway into the mixing chamber and a second position where the shuttle contacts the second valve seat to block fluid flow at least partially from the second passageway into the mixing chamber,
wherein the body further comprises:
a central conduit extending between first and second open ends, the central conduit defining the mixing chamber, a first sleeve insert received in the first open end of the central conduit and partially defining the first passageway, an end of the first sleeve insert defining the first valve seat, a second sleeve insert received in the second open end of the central conduit and partially defining the second passageway, an end of the second sleeve insert defining the second valve seat, a first end cap closing the first open end of the central conduit and defining a bore, a second end cap closing the second open end of the central conduit and defining a bore, wherein the shuttle further comprises a stem having a first end and a second end, and a first plugs and a second plug are located on the stem, and wherein the first end of the stem is slidingly received in the bore of the first end cap and the second end of the stem is slidingly received in the bore of the second end cap.

2. The valve according to claim 1, wherein the first plug and the second plug each include a trim surface, and the trim surfaces have an equal percentage shape.

3. The valve according to claim 1, wherein the first plug and the second plug each include a trim surface, and the trim surfaces have the same shape.

4. The valve according to claim 1, wherein the first plug and the second plug are separate pieces.

5. The valve according to claim 1, wherein the first plug and the second plug are separate pieces and are secured such that proximal ends of the plugs touch.

6. The valve according to claim 1, wherein the first plug and the second plug are unitarily formed as a single piece.

7. The valve according to claim 1, wherein the first plug includes a radially extending flange at the proximal end for contacting the first valve seat when the shuttle is in the first position, and the second plug includes a radially extending flange at the proximal end of the second plug for contacting the second valve seat when the shuttle is in the second position.

8. The valve according to claim 1, wherein when the shuttle is in the first position the shuttle fully blocks fluid flow from the first passageway into the mixing chamber and when the shuttle is in the second position the shuttle fully blocks fluid flow from the second passageway into the mixing chamber.

9. The valve according to claim 1, wherein when the shuttle is equally positioned between the valve seats a flow from the first passageway into the mixing chamber and a flow from the second passageway into the mixing chamber are equal.

10. The valve according to claim 1, wherein the shuttle further comprises a stem having a first end and a second end, and the first plug and the second plug are located on the stem.

11. The valve assembly including the valve according to claim 1, further comprising an actuator secured to one of the ends of the stem of the shuttle.

12. The valve assembly according to claim 11, wherein the actuator includes a stepper motor.

13. The valve assembly according to claim 11, further comprising, a temperature sensor located in the third passageway, and a controller connected to the temperature sensor and the actuator and programmed to instruct the actuator to move the shuttle based at least in part on data received by the controller from the temperature sensor.

14. The valve according to claim 13, wherein the controller is programmed to slow the speed of the actuator as the shuttle approaches the first and the second valve seats.

15. A valve station including the valve assembly according to claim 11, and further comprising:

a cold water conduit connected to the first inlet of the valve;

a hot water conduit connected to the second inlet of the valve;

a mixed water conduit connected to the outlet of the valve;

shut-off valves located in the cold water, the hot water and the mixed water conduits; and a frame supporting the conduits and the valve assembly.

16. The valve station according to claim 15, further comprising a recirculation water conduit supported by the frame, wherein a diversion conduit is connected between the recirculation water conduit and the cold water conduit.

17. The valve according to claim 1, wherein the body further comprises, a first leg connected to the central conduit and defining the first inlet and partially defining the first passageway, a second leg connected to the central conduit and defining the second inlet and partially defining the second passageway, and a third leg connected to the central conduit and defining the outlet and the third passageway, wherein the legs extend substantially perpendicular to the central conduit.

18. The valve according to claim 1, further comprising check valves located in the first and the second passageways for preventing reverse flow out of the first and the second inlets.

19. A valve comprising:

a mixing chamber having two inlets and an outlet, a first valve seat located between the first inlet and the mixing chamber, and a second valve seat located between the second inlet and the mixing chamber;

a first passageway connecting the first inlet to the mixing chamber and a second passageway connecting the second inlet to the mixing chamber; and a shuttle assembly located in the mixing chamber and movable between the two inlets, from a first position where the shuttle blocks fluid flow at least partially from the first inlet into the mixing chamber and a second position where the shuttle blocks fluid flow at least partially from the second inlet into the mixing chamber, the shuttle including:

a first plug facing the first valve seat, the first plug having a trim surface extending between a distal end and a proximal end, the proximal end being spaced further from the first valve seat than the distal end, wherein the trim surface includes at least one concave section and at least one convex section between the distal and proximal ends, and a second plug facing the second valve seat, the second plug having a trim surface extending between a distal end and a proximal end, the proximal end of the second plug being spaced further from the second valve seat than the distal end of the second plug, wherein the trim surface includes at least one concave section and at least one convex section between the distal and proximal ends, wherein the at least one concave section and the at least one convex section of the trim surface of each of the first plug and the second plug collectively define a non-linear metering profile such that axial displacement of the shuttle produces a non-linear relationship between shuttle position and flow rate into the mixing chamber.

20. The valve of claim 19, wherein the mixing chamber comprises:

a central conduit extending between first and second open ends, a first sleeve insert received in the first open end of the central conduit and partially defining the first passageway, an end of the first sleeve insert defining the first valve seat, a second sleeve insert received in the second open end of the central conduit and partially defining the second passageway, an end of the second sleeve insert defining the second valve seat, a first end cap closing the first open end of the central conduit and defining a bore, and a second end cap closing the second open end of the central conduit and defining a bore.

21. A mixing valve comprising:

a chamber having:

a first and second inlet;

an outlet;

a first and second passageway connecting the first and second inlet to the chamber; and a first valve seat located between the first passageway and the chamber, and a second valve seat located between the second passageway and the chamber; and a shuttle assembly having:

a first plug facing the first valve seat, an outer diameter of the first plug being larger at a proximal end than at a distal end such that the first plug has a tapered profile, and a second plug facing the second valve seat, an outer diameter of the second plug being larger at a proximal end than at a distal end of the second plug such that the second plug has a tapered profile, wherein the proximal end of the first plug and the proximal end of the second plug define opposing proximal faces that directly contact one another to form a common interface, the tapered profile of the first plug extending in a first axial direction from the common interface and the tapered profile of the second plug extending in an opposite axial direction from the common interface, the shuttle assembly being axially displaceable to produce a non-linear relationship between shuttle position and flow rate of fluid from the first and second passageways into the chamber, wherein the shuttle assembly is configured to:

in a first position, contact the first valve seat via the distal end of the first plug to block fluid flow at least partially from the first passageway into the chamber; and in a second position, contact the second valve seat via the distal end of the second plug to block fluid flow at least partially from the second passageway into the chamber.

22. The mixing valve of claim 21, wherein the shuttle assembly further comprises a stem having a first end and a second end, the plugs being located on the stem, the first end of the stem slidingly received in a bore of a first end cap closing the chamber and the second end of the stem slidingly received in a bore of a second end cap closing the chamber.

23. The mixing valve of claim 21, wherein the chamber comprises:

a central conduit extending between first and second open ends, a first sleeve insert received in the first open end of the central conduit and partially defining the first passageway, an end of the first sleeve insert defining the first valve seat, a second sleeve insert received in the second open end of the central conduit and partially defining the second passageway, an end of the second sleeve insert defining the second valve seat, a first end cap closing the first open end of the central conduit and defining a bore, and a second end cap closing the second open end of the central conduit and defining a bore.

* * * * *